United States Patent
Burkitt

[15] 3,662,869
[45] May 16, 1972

[54] METHOD AND APPARATUS FOR CHANGING CONVEYOR BELT

[72] Inventor: Sherman Carl Burkitt, Arlington Heights, Ill.

[73] Assignee: FMC Corporation, San Jose, Calif.

[22] Filed: Nov. 16, 1970

[21] Appl. No.: 89,961

[52] U.S. Cl. .................................................................198/1
[51] Int. Cl. ..............................................................B65g 15/00
[58] Field of Search ...........................198/1, 184; 187/27, 71; 74/258

[56] References Cited

FOREIGN PATENTS OR APPLICATIONS 1,128,126  9/1968  Great Britain............................187/71

Primary Examiner—Edward A. Sroka
Attorney—F. W. Anderson, C. E. Tripp and J. F. Verhoeven

[57] ABSTRACT

A pay-out reel containing new belting is positioned adjacent the conveyor. The old endless belt is severed and the leading edge thereof is connected to a take-up reel. The leading edge of the new belting is temporarily connected to the trailing edge of the old belting so that when the conveyor is driven, the old belt will pull the new belting around the conveyor. The new belting is trained over the take-up reel to rotate the take-up reel. When the new belting is completely around the conveyor, the leading edge thereof is disconnected from the old belting and the new belting is severed from the pay-out reel to be spliced into an endless belt.

12 Claims, 11 Drawing Figures

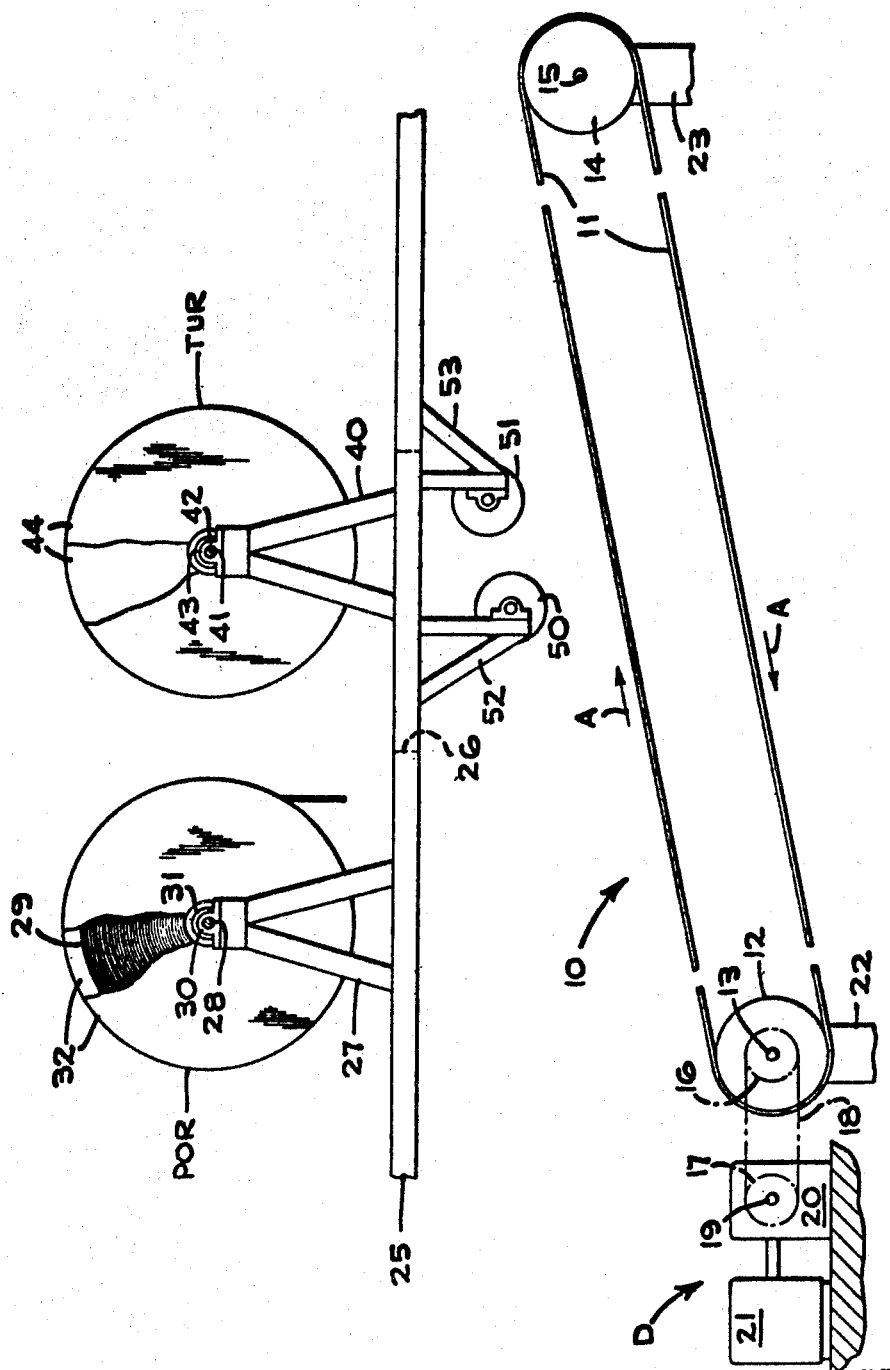
FIG_1

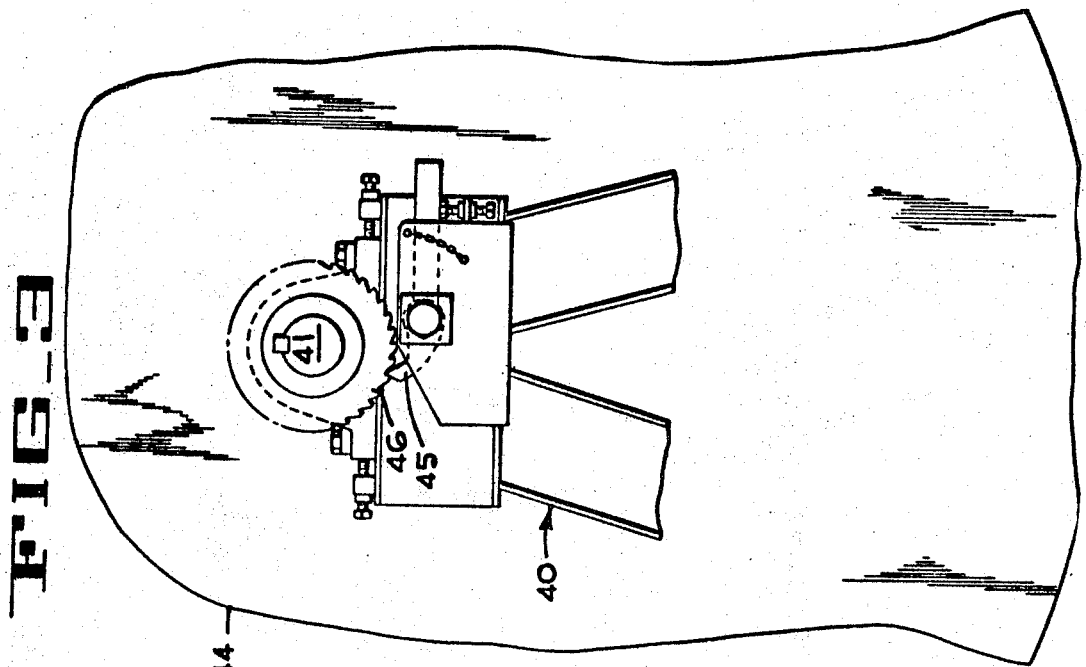
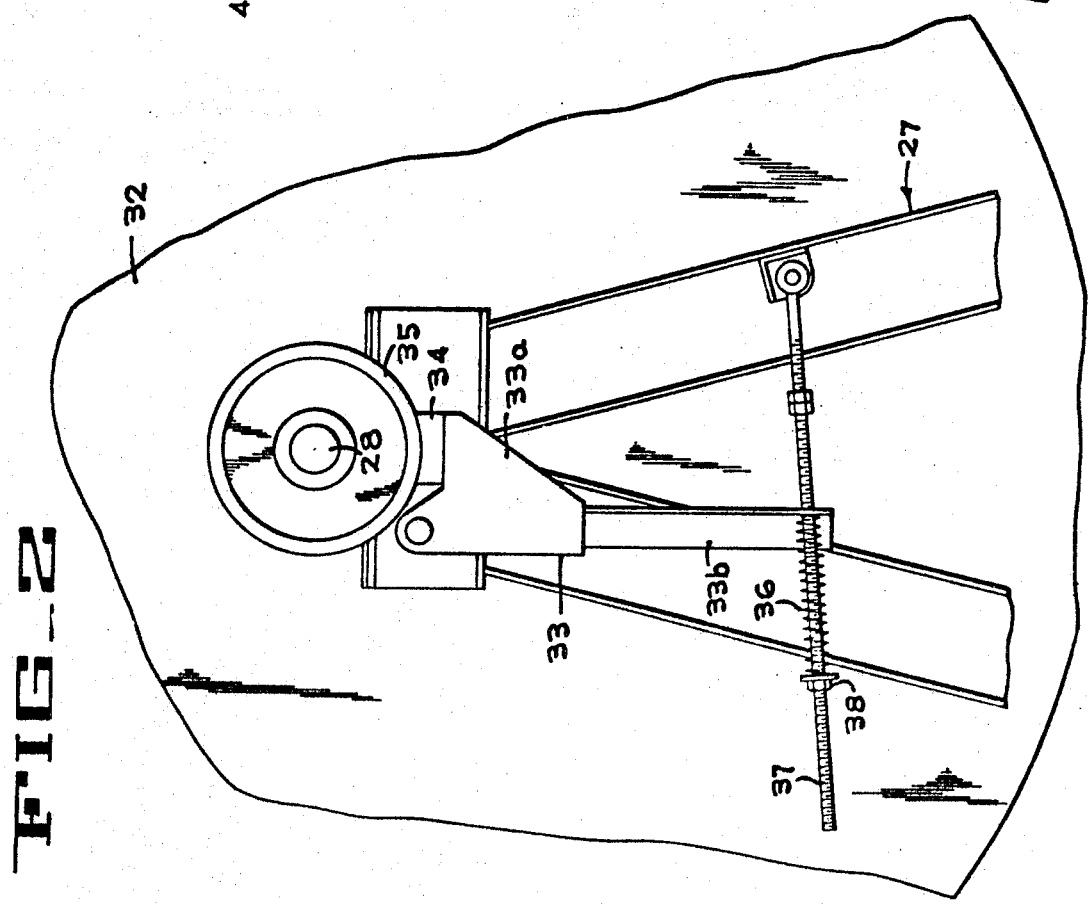

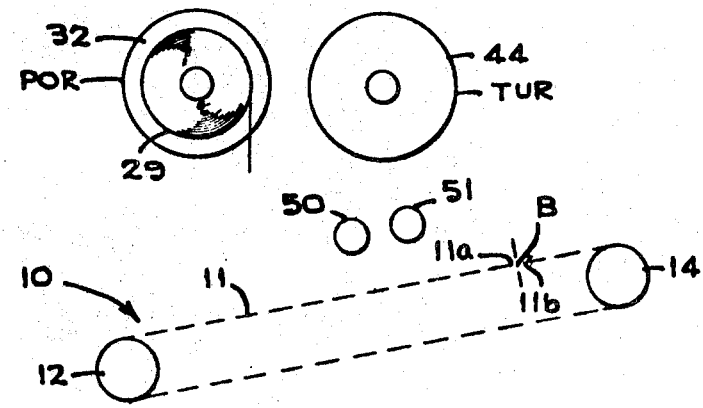
FIG_4
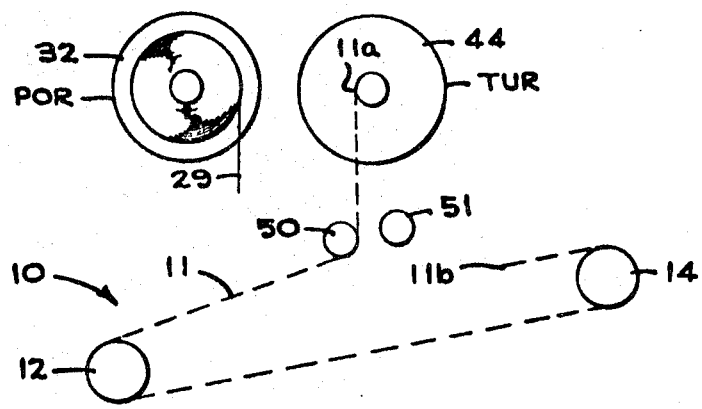
FIG_5
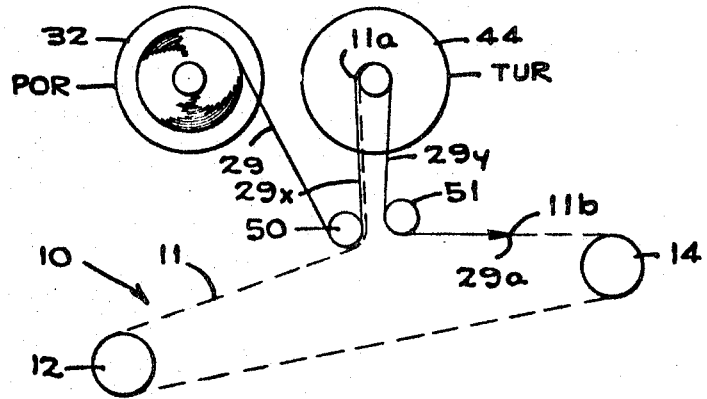
FIG_6

FIG_7
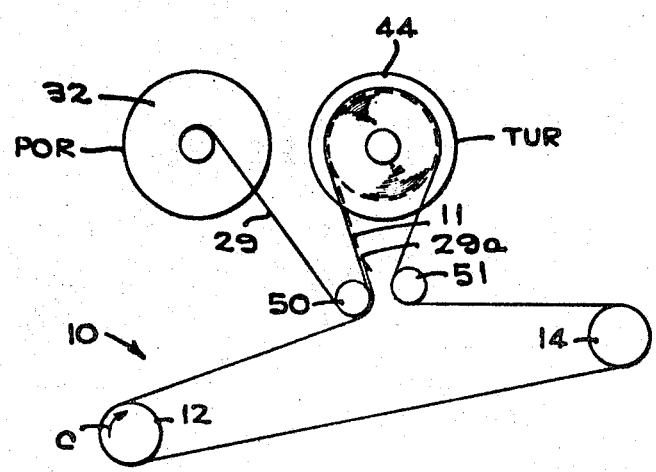
FIG_8
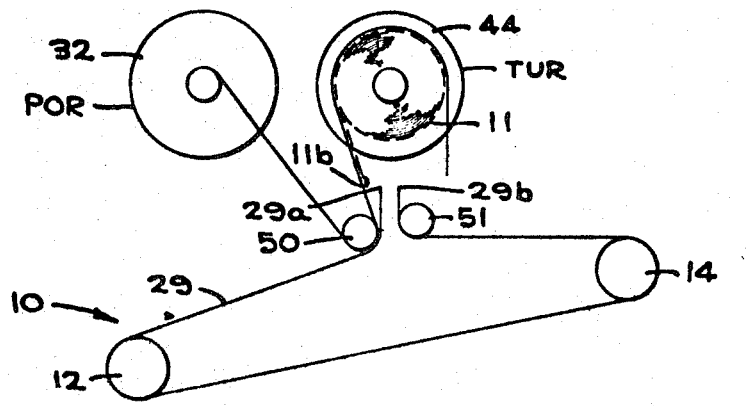

FIG_9
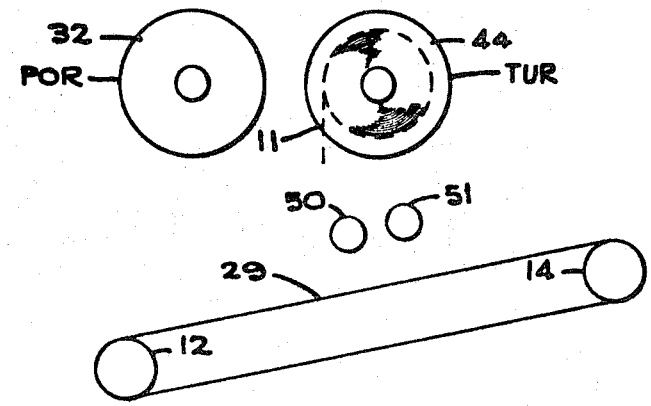
FIG_10
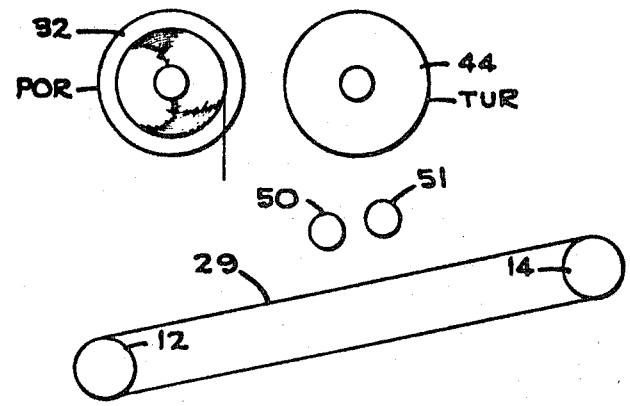

FIG_11

```
┌─────────────────────────────────────────────────────────────┐
│  SEVER OLD BELT DOWNSTREAM OF TAKE-UP REEL.                 │
└─────────────────────────────────────────────────────────────┘
                              ↓
┌─────────────────────────────────────────────────────────────┐
│  ATTACH LEADING EDGE OF SEVERED BELT TO TAKE-UP REEL.       │
└─────────────────────────────────────────────────────────────┘
                              ↓
┌─────────────────────────────────────────────────────────────┐
│  RUN NEW BELT FROM PAY-OUT REEL OVER TAKE-UP REEL           │
│  TO TRAILING EDGE OF OLD BELT.                              │
└─────────────────────────────────────────────────────────────┘
                              ↓
┌─────────────────────────────────────────────────────────────┐
│  EFFECT TEMPORARY SPLICE OF LEADING EDGE OF NEW BELT        │
│  TO TRAILING EDGE OF OLD BELT.                              │
└─────────────────────────────────────────────────────────────┘
                              ↓
┌─────────────────────────────────────────────────────────────┐
│  WIND OLD BELT ON TAKE-UP REEL BY CONVEYOR DRIVE PULLEY     │
│  TO BRING LEADING EDGE OF NEW BELT BACK TO UPSTREAM SIDE    │
│  OF TAKE-UP REEL.                                           │
└─────────────────────────────────────────────────────────────┘
                              ↓
┌─────────────────────────────────────────────────────────────┐
│  DISCONNECT LEADING EDGE OF NEW BELT FROM TRAILING EDGE     │
│  OF OLD BELT UPSTREAM FROM TAKE-UP REEL.                    │
└─────────────────────────────────────────────────────────────┘
                              ↓
┌─────────────────────────────────────────────────────────────┐
│  SEVER NEW BELT DOWNSTREAM FROM TAKE-UP REEL TO FORM        │
│  TRAILING EDGE OF NEW BELT.                                 │
└─────────────────────────────────────────────────────────────┘
                              ↓
┌─────────────────────────────────────────────────────────────┐
│  EFFECT PERMANENT SPLICE OF LEADING AND TRAILING EDGES      │
│  OF NEW BELT BYPASSING TAKE-UP REEL.                        │
└─────────────────────────────────────────────────────────────┘
                              ↓
┌─────────────────────────────────────────────────────────────┐
│  REMOVE TAKE-UP REEL WITH OLD BELT.                         │
└─────────────────────────────────────────────────────────────┘
                              ↓
┌─────────────────────────────────────────────────────────────┐
│  SHIFT EMPTY PAY-OUT REEL TO TAKE-UP POSITION.              │
└─────────────────────────────────────────────────────────────┘
                              ↓
┌─────────────────────────────────────────────────────────────┐
│  PLACE NEW PAY-OUT REEL WITH NEW BELT IN READINESS          │
│  FOR NEXT CHANGE.                                           │
└─────────────────────────────────────────────────────────────┘
```

3,662,869

METHOD AND APPARATUS FOR CHANGING CONVEYOR BELT

BACKGROUND OF THE INVENTION

1. Field of the Invention

This invention relates to belt conveyors and, more specifically, to the changing of belts thereof.

2. Description of the Prior Art

Conveyor belts become worn with use and must be changed. In instances where the use is heavy, belts must be changed frequently. Conveyor belts, particularly long endless belts, are awkward to handle and changing the belt can be an arduous and tedious job. Since the conveyor must be out of use while the belt is being changed, it is important that the belt can be changed as quickly as possible, particularly if the belt, because of heavy use, wears out frequently.

In order to facilitate and expedite the changing of conveyor belts, it has been known heretofore to use a pay-out reel with a web of new belting, the leading edge of which is temporarily connected to the trailing severed edge of the old endless belt. The severed leading edge of the old belt is connected to a power driven take-up reel, which, when the motor thereof is energized, winds up the old belt and pulls the new belt from the pay-out reel around the conveyor. Thereafter, the new belt is separated from the old belt, the new belt is severed, and the ends of the new belt are spliced to form a new endless belt on the conveyor.

Although, generally, the take-up reel will wind up the old belt and pull the new belt around the conveyor at a reduced rate, the motor for the take-up reel must be large enough to keep the belts moving around the conveyor. This motor, however, must stand idle most of the time since its only function is to wind up the old belt and pull the new belt around the conveyor during belt changing. Therefore, the expense of this equipment is high when considered in relation to the relatively slight anticipated use thereof.

SUMMARY OF THE INVENTION

In the present invention, no extra take-up reel motor is required to drive the take-up reel. Instead, the power for winding up the old belt and pulling the new belt around the conveyor is supplied by the regular conveyor motor. In brief, the leading edge of the new belting is temporarily connected to the severed trailing edge of the old endless belt, and the leading severed edge of the old endless belt is connected to the take-up reel, as in prior art belt changing. However, the pay-out and take-up reels are positioned so that the new belting from the pay-out reel can be trained over the take-up reel and over the old belting being wound thereon. Preferably, two closely spaced rollers are positioned to guide the new belting as it approaches and leaves the take-up reel so that the new belting gets the maximum purchase on the take-up reel. When the conveyor motor is energized (preferably, at a "creep" speed), the new belting is pulled over the take-up reel to rotate the reel and wind up the old belting thereon. When the new belting has completely replaced the old belting on the conveyor, the new belting is disconnected from the old belting, and is then severed and spliced to form a new endless belt. Thus, in the present invention the power to wind up the old belt and pull the new belt around the conveyor is supplied by the conveyor motor and is transmitted to a take-up reel by the old and new belting.

It is therefore one object of the present invention to remove old belting and supply new belting for a conveyor utilizing the regular conveyor motor.

It is another object of the present invention to power a take-up reel while changing the belting on a conveyor by the conveyor motor through the old and new belting.

It is yet another object of the present invention to drive a take-up reel to wind up an old endless belt by training a web of new belting connected to the old belt over the take-up reel.

BRIEF DESCRIPTION OF THE DRAWINGS

FIG. 1 is a side elevation view showing apparatus of the present invention, with parts omitted for clarity.

FIG. 2 is a side elevation of a brake mechanism for the pay-out reel.

FIG. 3 is a side view of a ratchet mechanism for the take-up reel.

FIGS. 4 through 10 are schematic diagrams of the apparatus of FIG. 1, viewed as in FIG. 1, showing the steps in the practice of the present invention.

FIG. 11 is a chart summarizing the steps of the present invention.

DESCRIPTION OF THE PREFERRED EMBODIMENT

There is shown in FIG. 1, a conveyor, indicated generally at 10, which has an endless belt 11. At one end, the endless belt is received over a drive pulley 12 which is mounted on shaft 13, and, at the opposite end, the belt is received over pulley 14 which is mounted on shaft 15. Shaft 13 has a sprocket 16 thereon which is connected to a sprocket 17 by chain 18. Sprocket 17 is mounted on the output shaft 19 of a speed reducer 20 which is driven by electric motor 21. The speed reducer 20 and motor 21 define a drive unit D which drives the conveyor belt 11 in the direction indicated by arrows A at selected speeds including an operating speed, for normal load carrying operation, and a creep speed, which is used during belt changing. The conveyor 10, which is mounted on supports 22 and 23, is inclined (in the embodiment of the invention illustrated) and carries material or articles (not shown) up the incline.

A platform 25, which extends over the conveyor, has an opening 26 therein. A first four legged support 27 is positioned at one end of opening 26. A shaft 28, on which a web of new belting 29 is wound, is journaled in bearings 30 mounted on the support and is held in the bearings by collars 31. The shaft 28, which defines a pay-out reel POR for the web of new belting, has side flanges 32 secured thereto to keep the new belting centered on the reel. As shown best in FIG. 2, a retarding brake has a bell crank 33 pivotally connected to support 27. Brake block 34 on one arm 33a of the bell crank 33 is urged into braking engagement with a brake wheel 35 on shaft 28 by spring 36. A rod 37, which extends from the support 27 through the other arm 33b of the bell crank, receives the spring 36 between nut 38 and arm 33b of the bell crank. This brake prevents the web of new belting from unwinding in the absence of a positive pulling force on the web.

A second four legged support 40 straddles the opening 26. A shaft 41, on which the old belt 11 is received when the belt is changed, is journaled in bearings 42 mounted on support 40 and held in the bearings by collars 43. The shaft 41 defines a take-up reel TUR and has secured thereto side flanges 44 to keep the belting wound thereon centered on the reel. As shown best in FIG. 3 a retarding pawl and ratchet is provided to prevent the take-up reel from unwinding. A pawl 45, which is pivotally mounted on support 40, is biased by gravity into engagement with ratchet wheel 46 mounted on shaft 41, permitting the reel to turn freely in the take-up direction but preventing the reel from unwinding by turning in the opposite direction.

As shown in FIG. 1, a pair of closely spaced pulleys, 50 and 51, are mounted under the opening in the platform 25 by supports 52 and 53 respectively. The pulleys 12 and 14 which support the endless belt 11 during operation of the conveyor, the pay-out and take-up reels POR, TUR, and the two pulleys 50 and 51 are all aligned in the same vertical plane to all receive a single web of belting without twisting of the belt.

Changing the belt in accordance with the present invention is illustrated in FIGS. 4 to 10. Initially, as shown in FIG. 4, with the drive deenergized, the old endless belt 11 (which is shown in FIGS. 4 to 10 in dotted lines) is severed at point B to form a leading edge 11a and a trailing edge 11b. At this time, the pay-out reel has new belting 29 thereon. As shown in FIG. 5, the leading edge of the old belt 11 is trained around pulley 50 (to pass between pulleys 50 and 51) and is connected to the take-up reel shaft 41. As shown in FIG. 6, the leading edge 29a of the new belting is also trained around pulley 50 (being threaded under the old belting 11). The web of new belting 29, which is on the pulley side of the old belting at pulley 50, is trained along the old belting between pulley 50 and shaft 41, and then around shaft 41 on top of the old belting 11. The leading edge 29a of the new belting is then passed around pulley 51 (between pulley 51 and pulley 50) and temporarily fastened to the trailing edge 11b of the old belting.

It will be noted that neither the pay-out reel, or pulley, the take-up reel or pulley, nor the guide pulleys 50, 51 have their own motor or power drive means. Instead, the power for winding up the old belt and pulling the new web of belting around the conveyor comes from the regular conveyor drive mechanism D comprising motor 21 and speed reducer 20.

As indicated in FIG. 7, the motor 21 and speed reducer 20 are started to turn the drive pulley 12 at a creep speed in the direction indicated by arrow C. The belt 11 is driven at a creep speed by pulley 12 to pull the leading edge 29a of the new belt from the position shown in FIG. 6, around pulley 14, around pulley 12, and around pulley 50, to the position shown in FIG. 7. As the old belt 11 pulls the new belt 29 around the path of the conveyor belt, the new belt, which is trained around the take-up reel TUR, drives the take-up wheel to wind up the old belt. It will be noted that the guide rollers, or pulleys, 50 and 51, keep the run 29x of new belting approaching the take-up reel close to the run 29y of new belting leaving the take-up reel so that the new belting has at least a wrap of 180° (see FIG. 6) around the take-up reel to provide a good purchase of the new belting on the take-up reel.

It should also be noted that it is the old belting 11 only which is wound up on the take-up reel TUR; the new belting 29 merely passes over the reel and the old belting thereon to drive the reel leaving the reel less than a full 360° after entering the reel.

As shown in FIG. 8, after the leading edge of the new belting has been pulled around pulley 50, the leading edge of the new belting is disconnected from the trailing edge of the old belting. At the same time, the new belting is severed at a point opposite the leading edge of the new belting (that is, at a point between the take-up reel TUR and the guide pulley 51). Severing the new belt forms a trailing edge 29b for the new belt which is permanently spliced to the leading edge of the new belting, below the guide pulleys, as indicated in FIG. 9. At this time then, the new endless belt 29 is installed over pulleys 12 and 14, and the old belting 11 is wound on the take-up reel. Thereafter, as indicated in FIG. 10, the take-up reel TUR is removed and the remnant of new belting is removed from the pay-out reel POR. The empty pay-out reel is then shifted to support 40 to become the next take-up reel, and another reel of new belting is mounted on support 27.

Although the best mode contemplated for carrying out the present invention has been herein shown and described, it will be apparent that modification and variation may be made without departing from what is regarded to be the subject matter of the invention.

What is claimed is:

1. The method of removing a severed endless belt of an endless belt conveyor and substituting new belting therefor comprising the steps of securing one end of the severed belt to a rotary member, training a web from a source of new belting over the rotary member and the old belting thereon, temporarily connecting the leading edge of the new belting to the end opposite said one end of the severed belt, and operating the conveyor drive to pull the web of new belting from said source over the rotary member and thereby rotate said rotary member to wind up the old belt and pull the new belting around the conveyor.

2. The method of changing the belt on an endless belt conveyor comprising the steps of severing the old belt to form a leading edge and a trailing edge, securing the leading edge of the old belt to a take-up reel, training a web from a pay-out reel of new belting over the take-up reel and the old belting thereon, temporarily connecting the leading edge of the new belting to the trailing edge of the old belting, and operating the conveyor drive to pull the web of new belting from the pay-out reel and thereby rotate the take-up reel to wind up the old belt and pull the new belting around the conveyor.

3. The method of claim 2 including the steps of disconnecting the leading edge of the new belting from the trailing edge of the old belting after the new belting has been pulled around the conveyor, and splicing the new belting to form an endless belt.

4. The method of claim 2 including the steps of disconnecting the leading edge of the new belting from the trailing edge of the old belting after the new belting has been pulled around the conveyor, severing the new belt to form a trailing edge thereof adjacent the leading edge thereof, and splicing leading and trailing edges of the new belt to form an endless belt.

5. The method of removing a severed endless belt of an endless belt conveyor and substituting new belting therefor comprising the steps of securing one end of the severed belt to a rotary member, training a web from a source of new belting over the rotary member and the old belting therein to form a first run of new belting leading toward said rotary member and to form a second run of new belting leading from said rotary member, temporarily connecting the leading edge of the new belting to the end opposite said one end of the severed belt, operating the conveyor drive to pull the web of new belting from said source over the rotary member and thereby rotate said rotary member to wind up the old belt and pull the new belting around the conveyor, and guiding the new belting to bring said first run and second run of new belting close together to obtain good purchase of the new belting on the rotary member.

6. The method of claim 5 in which said first and second runs are guided on the conveyor side of the rotary member.

7. The method of claim 5 in which said first and second runs are guided to extend in parallel relation between the rotary member and the path of the conveyor.

8. The method of changing the belt on an endless belt conveyor comprising the steps of severing the old belt to form a leading edge and a trailing edge, securing the leading edge of the old belt to a take-up reel, training a web from a pay-out reel of new belting over the take-up reel and the old belting thereon, temporarily connecting the leading edge of the new belting to the trailing edge of the old belting, operating the conveyor drive to pull the web of new belting from the pay-out reel, guiding the run of belting into the take-up reel and the run of belting out of the take-up reel in closely spaced and substantially parallel relation, disconnecting the leading edge of the new belting from the trailing edge of the old belting after the new belting has been pulled around the conveyor with the leading edge of the new belting between the conveyor and the take-up reel, severing the new belting between the conveyor and the take-up reel to form a trailing edge thereof, and splicing the leading and trailing edges of the new belting to form a new endless belt on the conveyor.

9. Apparatus for changing belting on a conveyor comprising a source of new belting adjacent the conveyor to pay out new belting when the leading edge of the new belting is connected to the trailing edge of the old belting, and a rotary member to take-up the old belting when the leading edge of the old belting is connected to the rotary member, said rotary member positioned in the path of the new belting for take-up rotation thereby.

10. Apparatus for changing the endless belt on an endless belt conveyor comprising a pay-out reel adjacent the conveyor to pay out new belting when the leading edge of the new belting is connected to the trailing edge of the old belting, and a take-up reel to take up the old belting when a severed end of the old belting is connected to the take-up reel, said take-up reel positioned in the path of the new belting for rotation thereby.

11. Apparatus for changing the endless belt on an endless belt power driven conveyor comprising a pay-out reel adjacent the conveyor to pay out new belting when the leading edge of the new belting is connected to the trailing edge of the old belting, a take-up reel to take up the old belting when a severed end of the old belting is connected to the take-up reel, and guides to receive the new belting and train the new belting over the take-up reel and over the old belting on the take-up reel to drive the take-up reel.

12. The apparatus of claim 11 in which the guides are positioned in closely spaced relation adjacent the conveyor and in which the new belting defines closely spaced, substantially parallel runs to and from the take-up reel.

* * * * *